Dec. 10, 1935.  S. S. REYNOLDS  2,023,697
RAKE ATTACHMENT FOR LAWN MOWERS
Filed Jan. 4, 1935
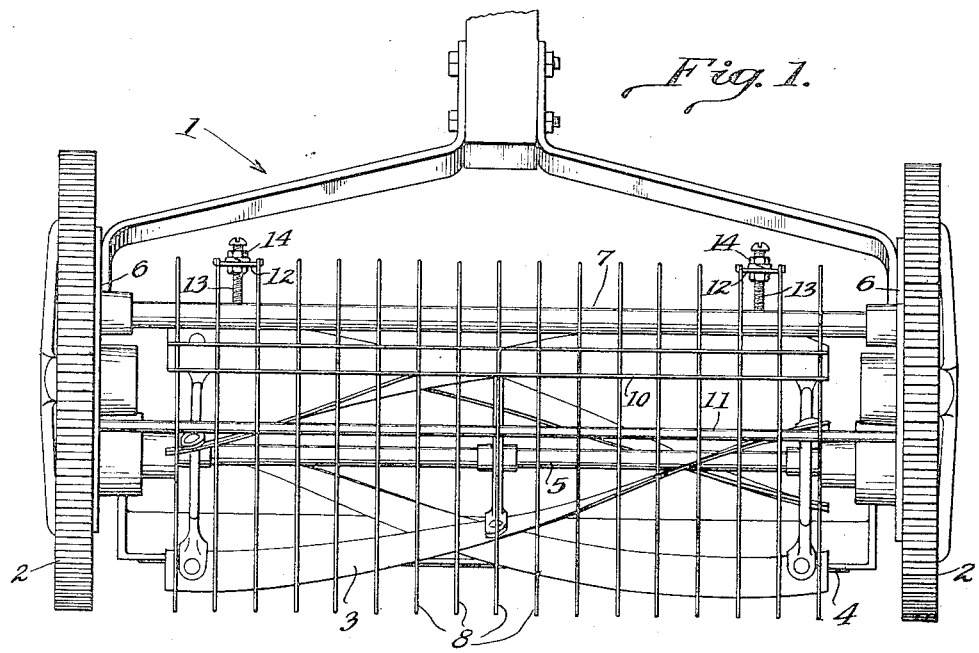
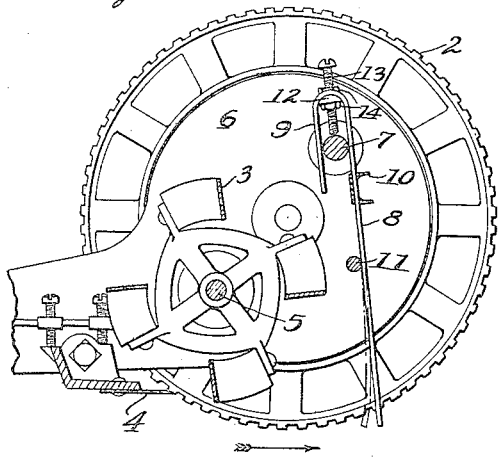 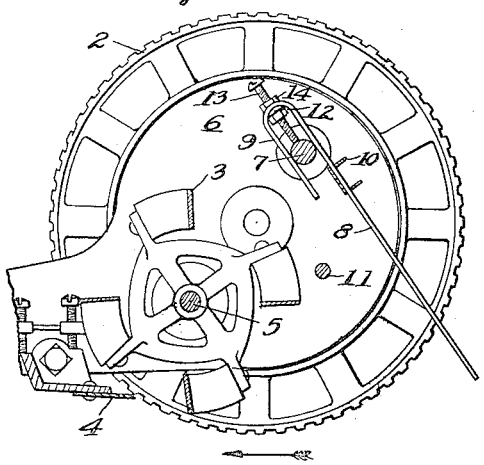
Inventor
Saxe S. Reynolds
By W. S. McDowell
Attorney Patented Dec. 10, 1935

2,023,697

UNITED STATES PATENT OFFICE 2,023,697

RAKE ATTACHMENT FOR LAWN MOWERS

Saxe S. Reynolds, Columbus, Ohio

Application January 4, 1935, Serial No. 421

5 Claims. (Cl. 56—294)

This invention relates to an improved rake attachment for manual or power actuated lawn movers, and has particular reference to rake attachments of the type which are carried by a lawn mower in advance of its cutting blades. An object of the invention is to provide an improved attachment for the purpose of cultivating, combing or raking the grass, weeds or other vegetable growths which the mower is adapted to sever in order that such growing matter may be lifted and properly presented to the action of the cutting blades of the associated mower to provide for an improved cutting action and to facilitate the operation of the mower.

It is another object of the invention to provide a raking attachment for lawn mowers which comprises a plurality of frame-carried resilient wire tines which are adapted to be mounted in their supporting frame in relatively spaced order and in advance of the cutting blades of the associated mower, in order that the lower resiliently movable free ends of the tines may comb the grass prior to the presentation of the latter to the cutting blades of the mower so that grass, weeds or tangled growths which ordinarily lie flat on the ground and can not be readily cut by the mower are elevated and separated so that they may be sharply and cleanly severed by the normal operation of the mower.

A further object of the invention resides in the provision of a raking attachment of the character indicated which is adapted to be carried in readily removable connection with the ordinary transverse cross rod of a lawn mower and which has its ends connected with the stationary gear casings of the mower, in order that the tines of the attachment will be positioned substantially vertically when in active operation with the lower resilient ends of the tines in engagement with the grass or other growths to be cut and in advance of the cutting blades.

Again, it is a further object of the invention to provide means for adjusting and maintaining the adjustment of the tines vertically to regulate the depth of contact of the lower resilient ends thereof with respect to the growths to be cut.

Other objects of the invention reside in the provision of a simple, readily applied or demountable raking attachment for lawn mowers which in operation will be disposed substantially within the confines of the ground engaging wheels of the mower so that the attachment will not interfere with the usual operations of a lawn mower in cutting adjacent to walls, bushes, trees and other upstanding obstructions, and wherein the tines are freely movable so that the same will readily adapt themselves to irregularities, minor obstructions in the lawn surface undergoing cutting and to provide an improved mounting for the attachment so that the same may be readily and instantly removed from an associated mower when the services of the attachment are not required.

For a further understanding of the invention, reference is to be had to the following description and the accompanying drawing, wherein:

Fig. 1 is a front elevation of a lawn mower provided with a rake attachment comprising the present invention;

Fig. 2 is a vertical longitudinal sectional view taken through the lawn mower and the rake attachment, the latter being shown in its operative position during forward travel of the lawn mower in an advancing or grass cutting direction;

Fig. 3 is a similar view disclosing the attachment in an elevated position which it may assume when the lawn mower is being moved in a rearward direction.

Referring more particularly to the drawing, the numeral 1 designates a lawn mower of the conventional manually operated type. While this type of lawn mower has been selected for illustration, nevertheless, it will be understood, particularly as the description progresses, that the invention is applicable to many different types of lawn mowers, such as multiple or gang mowers, as well as mowers of the motor propelled types. The lawn mower illustrated comprises the usual ground engaging wheels 2—2, the helical cutting blades 3 and a cutter bar 4, the blades 3 being rotated by the shaft 5, which is driven by means of the customary gearing (not shown) associated with the ground wheels 2, such gearing being protected by stationary casings 6, the latter being united, as usual, by a transversely extending rod 7 arranged to the front of and above the blades 3.

My improved rake attachment is adapted to be carried in connection with the rod 7, but conveniently removable therefrom, and to engage the ground in advance of the blades 3. In its preferred form, the rake attachment comprises a plurality of substantially vertically disposed and transversely spaced resilient wire tines 8. These tines have their upper ends bent to form open ended hooks 9 which are loosely received over the stationary rod 7 which unites the gear casings 6. The tines are held in their operatively spaced order by means of a channel-shaped spacing bar 10, while a stationary rod 11, united at its ends with the casings 6, is disposed in back of the tines at a position substantially midway of the length or height of the latter, as shown in Fig. 2, the rod 11 acting as a stop member in order that in the operation of the mower, with the attachment applied thereto, the said tines will be approximately vertically located in front of the cutting blades 3, with the lower ends of the tines free to resiliently flex or bend in any direction, whereby to adapt the tines to irregularities in the ground or lawn surface over which the mower is advanced.

Adjustment of the lower ends of the tines with respect to the ground surface is afforded by providing certain of the hooks 9 of the tines 8 with welded transversely extending saddles 12, the latter being provided with threaded openings for the reception of vertical adjusting screws 13, the lower ends of the latter being disposed for engagement with the upper surfaces of the rod 7, whereby through the adjustment of the screws 13, the rake attachment may be bodily adjusted in a substantially vertical direction to secure desired contact between the lower ends of the tines 8 and the lawn or ground surface. Lock nuts 14 may be provided in conjunction with the screws 13 to maintain the adjustment thereof. By this arrangement, it will be noted that the rake attachment may be applied to the mower by merely inserting the hook shaped ends 9 thereof over the rod, until the lower ends of the screws 13 contact with said rod, at the same time allowing the intermediate portions of the tines to engage with the front part of the stationary stop member 11. Corresponding convenience of course is obtained in the removal of the attachment from the lawn mower. As shown in Fig. 2, the attachment when in operation will lie substantially within the confines of the ground engaging wheels 2, in order that the attachment will not interfere in any way with the manipulation of the lawn mower around upstanding objects or in crowded areas.

The flexible wire tines of the attachment rake or comb grass so that the mower will cut more closely and uniformly than is possible without the attachment, since the resilient construction of the latter enables it to lift weeds, vines, wild grasses, dandelions and the like, which ordinarily pass under the cutting bar and smother the grass. Due, however, to its flexibility, the attachment does not tear and pull grass roots, but, on the contrary, yields readily around objects such as stones, humps of earth or other corresponding irregularities. This raking and combing serves in effect as a cultivating operation, resulting in healthier lawn conditions. The attachment rides on the machine and is not bolted or fastened thereto, but can be lifted off and set in place at will, working just ahead of the cutting blades. Again, the attachment is adjustable so that it may rake the ground or operate above the ground surface, raking up grass or close growing vegetation that the mower would normally pass over without cutting.

I am aware that it has been proposed in the prior art to provide lawn mowers with attachments seeking to accomplish the ends of the present invention. However, in the prior art, the attachments have comprised rigid bars or fingers disposed in advance of the cutting blades but which, owing to their rigidity, as distinguished from the resilient tines comprising the present invention, are incapable of elevating the grass or flat-growing weeds to permit the cutting blades to operate efficiently, the outstanding feature of the present invention being the resiliently movable tines by which this objective is accomplished.

What is claimed is:

1. A rake attachment for lawn movers comprising a plurality of flexible wire tines having one end thereof provided with hook shaped extremities operable to slidably engage a transverse rod uniting the gear cases of an associated lawn mower, a spacer for securing said tines in their relative parallel order, said spacer being transversely secured to said tines, and threaded means carried by the hook shaped extremities of said tines and engageable with said rod to vary the operative relationship between the lower ends of said tines and the lawn surface.

2. A rake attachment for lawn mowers comprising a plurality of relatively spaced substantially vertically disposed flexible wire tines, the latter having the upper portions thereof provided with hook-shaped extremities operable to loosely receive a transverse rod uniting the gear cases of an associated lawn mower, a spacer bar extending transversely of said tines and secured thereto for holding said tines in their separate relatively parallel order, transverse saddles uniting the hook-shaped upper portions of certain of said tines, and threaded means carried by said saddles and having their lower ends disposed in engagement with said transverse rod to control the spacing between the lower ends of said tines and the ground.

3. A rake attachment for lawn mowers comprising a horizontal bar carrying a plurality of relatively spaced resiliently yieldable tines connected together in parallel vertical relationship, the latter having one end thereof provided with a hook-shaped extremity formed to loosely receive a transverse rod uniting the gear cases of an associated lawn mower, whereby said tines are loosely carried by said rod and are freely removable therefrom without first removing attaching devices, and threaded means carried by the upper ends of certain of said tines and operable to engage with the upper surface of said rod only to control the spacing between the lower ends of said tines and the ground.

4. The combination with a lawn mower having gear cases and upper and lower stationary and transversely extending rods uniting said gear cases in advance of the cutting blades of the lawn mower, of a rake attachment for said lawn mower having a frame, a plurality of flexible wire tines carried in spaced vertical order by said frame, the upper portions of said tines being provided with hook-shaped extremities disposed to loosely receive the upper of said transverse rods, and threaded means carried by the upper ends of certain of said tines and engaging with the top portion only of the upper of said rods to vary the distance between the lower flexible ends of said tines and the ground, the lower of the transverse rods being disposed intermediate of the length of said tines and to the rear thereof and functioning as a stop member to limit the rearward swinging movement of said tines about the supporting axis afforded by the upper of said rods.

5. A rake attachment for lawn mowers which are constructed with gear cases united by a transverse rod, said rake attachment comprising a plurality of vertically disposed flexible wire tines having a hook-shaped extremity at one end thereof, a spacing bar secured transversely to said tines and holding the same in parallel order, said hook-shaped extremities being operable to engage the transverse rod of the lawn mower by hooking said extremities over said rod.

SAXE S. REYNOLDS.